No. 896,870. PATENTED AUG. 25, 1908.
A. E. TAYLOR.
STUFFING BOX.
APPLICATION FILED FEB. 2, 1906.
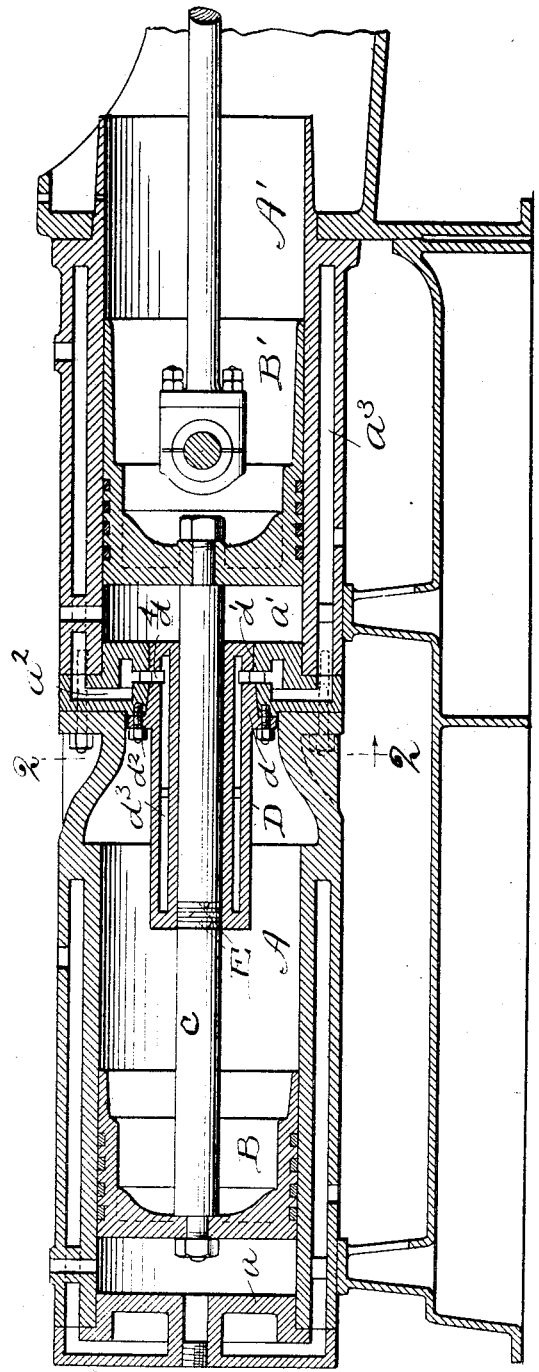
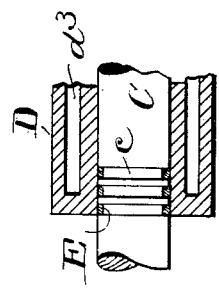
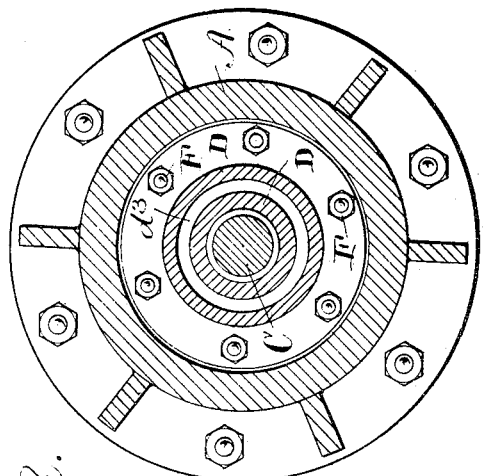
Witnesses.
Inventor.
Arthur E. Taylor,
By his Attorneys,
Thurston, Bates & Woodward

UNITED STATES PATENT OFFICE.

ARTHUR E. TAYLOR, OF ELYRIA, OHIO, ASSIGNOR TO THE ELYRIA GAS ENGINE COMPANY, OF ELYRIA, OHIO, A CORPORATION OF OHIO.

STUFFING-BOX.

No. 896,870.  Specification of Letters Patent.  Patented Aug. 25, 1908.

Application filed February 2, 1906. Serial No. 299,070.

*To all whom it may concern:*

Be it known that I, ARTHUR E. TAYLOR, a citizen of the United States, residing at Elyria, in the county of Lorain and State of Ohio, have invented a certain new and useful Improvement in Stuffing-Boxes, of which the following is a full, clear, and exact description reference being had to the accompanying drawings.

The object of this invention is to provide a very simple and efficient stuffing box for engines,—one that will not require constant repacking and will remain cool under all conditions.

My stuffing box is specially well adapted for an engine having a pair of tandem cylinders. It allows the engine to be made very compact, for it is unnecessary to provide space for continued access to the stuffing box. At the same time my stuffing box may be very conveniently removed when desired. In explosive engines, my stuffing box is water cooled by the circulating water from one of the cylinders. My mechanism, which embodies these features, is hereinafter more fully described and its essential characteristics set out in the claims.

In the drawings, Figure 1 is a vertical section through a tandem engine, showing my stuffing box in place. Fig. 2 is a cross section on the line 2—2 of Fig. 1. Fig. 3 is a fragmentary longitudinal section through the stuffing box.

The drawings show the stuffing box as applied to a tandem engine.

A represents one cylinder of the engine and A' the other cylinder. In these cylinders are pistons B B' respectively, which are connected by a solid piston rod C. This piston rod slides through the barrel D of my stuffing box which is mounted on the head $a'$ of the cylinder A'. Set into grooves $c$ in the piston rod are split packing rings E which engage the bore of the member D and with it constitute a stuffing box.

The length of the member D is at least as great, and preferably just equal to, the stroke of the engine. Thus the packing rings travel from one end of the bore to the other and being in continuous engagement therewith, preventing leakage. The box needs no more attention than the piston itself.

To allow the convenient removal of the stuffing box without taking the engine entirely apart, I secure it removably to the head $a'$ of the forward cylinder. The forward end of the stuffing box seats in an opening in this head, making a tight connection therewith. This connection may be tapered as shown at $d$ and straight as shown at $d'$. The barrel D is provided with an annular flange $d^2$ which lies against the outer face of the cylinder head $a'$; the barrel is secured to the head, by means of bolts and nuts F, the bolts passing through the flange into the cylinder head.

With the above described construction, when the rear cylinder head $a$ is removed and the piston B removed, access is provided to the nuts F, which may thus be removed and the stuffing box taken out. My stuffing box, therefore, requires for its removal no separation of the two cylinders, only part being occasionally removed which would necessarily be removed for attention to the rear piston.

In water cooled engines, I make the wall of the stuffing box barrel hollow, the annular passage way $d^2$, thus provided, communicating with the water jacket of one of the cylinders through the cylinder head which carries the stuffing box. Thus, as shown in the drawings, the water space $d^3$ of the stuffing box communicates through lateral ports $d^4$ with the water space $a^2$ in the cylinder head $a'$, and this water space communicates with the water jacket $a^3$ around the cylinder A'. By this means the circulation of water through the water jacket of the cylinder causes a circulation through the stuffing box barrel, keeping it cool.

It will be seen that my stuffing box, while being simple in construction and easily applied and removed, has the further advantage of occupying practically no extra space, for it extends simply into the hollow of the piston B at the forward stroke of the engine. Experience has demonstrated that the stuffing box is not only very efficient in service, but is durable and requires very little attention.

I claim:

1. The combination of a pair of tandem cylinders, a stuffing box removably carried by the intermediate cylinder head, pistons in said cylinders, a rod connecting them and passing through the stuffing box barrel, a spring ring on said rod engaging the bore of such barrel, the stuffing box having an external projection on the outer side of said intermediate cylinder head, bolts passing through such projection into the cylinder head which carries the barrel, the barrel in advance of such projection being tapered and occupying a tapered seat in the cylinder head.

2. The combination of a pair of tandem cylinders, the head of one of said cylinders being composed of an inner and outer member, there being an opening in the outer head-member having a tapering side and an opening in the inner head member with straight sides, and a stuffing box having a flange tapered to fit said tapering seat in the outer cylinder head and a straight portion adapted to fit the opening in said inner cylinder head, and means to hold the stuffing box to the cylinder head.

3. The combination of a pair of tandem cylinders, a stuffing box removably carried by the intermediate cylinder head, pistons in said cylinders, a rod connecting them and passing through the stuffing box barrel, the stuffing box having an external projection on the outer side of the intermediate cylinder head, the barrel being tapered in advance of such projection and occupying a tapered seat in the cylinder head, and means coöperating with the projection on the stuffing box for securing the stuffing box to the cylinder head.

In testimony whereof, I hereunto affix my signature in the presence of two witnesses.

ARTHUR E. TAYLOR.

Witnesses:
FREDERICK A. MILLER,
HEMAN ELY.